United States Patent [19]

Trenkamp et al.

[11] Patent Number: 5,052,170
[45] Date of Patent: Oct. 1, 1991

[54] SHREDDER ATTACHMENT FOR ROUND HAY BALER

[76] Inventors: Michael J. Trenkamp; Loras F. Gravel, both of P.O. Box 54, Dyersville, Iowa 52040

[21] Appl. No.: 537,787
[22] Filed: Jun. 14, 1990
[51] Int. Cl.⁵ .................... A01D 34/44; A01F 15/07
[52] U.S. Cl. ............................... 56/341; 56/12.7; 56/14.5; 56/256; 56/DIG. 9; 56/DIG. 20
[58] Field of Search .......... 56/341, 12.7, 14.5, 56/16.4, 256, 193, DIG. 9, DIG. 20, DIG. 17

[56] References Cited

U.S. PATENT DOCUMENTS

| | | | |
|---|---|---|---|
| 2,817,945 | 12/1957 | McClellan | 56/341 X |
| 3,295,299 | 1/1967 | Brady et al. | 56/12.7 |
| 3,362,144 | 1/1961 | Bumgardner | 56/341 X |
| 3,483,688 | 12/1969 | Hollyday | 56/341 |
| 3,604,188 | 9/1971 | Mott | 56/12.7 X |
| 3,606,748 | 9/1971 | Middlesworth | 56/12.7 X |
| 4,280,320 | 7/1981 | Eggers | 56/341 |
| 4,559,770 | 12/1985 | Mast | 56/341 |

Primary Examiner—Stephen J. Novosad
Attorney, Agent, or Firm—Fleit, Jacobson, Cohn, Price, Holman & Stern

[57] ABSTRACT

A shredder attachment for a round bale hay baler which will effectively shred corn stalks or stubble, milo stubble and the like and discharge the shredded stubble into a round bale hay baler which will form a bale of stubble which has been shredded which can be used for feed, bedding and the like. The shredding attachment can be easily and quickly attached to a round bale hay baler at the front lower area thereof and is drivingly connected to the power system of the hay baler and includes a rotatable shaft having a plurality of pivotal flail elements or knives mounted thereon for shredding stubble or stalks and discharging the shredded material rearwardly and upwardly into the hay baler in the same manner that hay enters the hay baler with the shredded stubble being rolled into a hay bale in the same manner that hay is baled by the round bale hay baler. The shredder attachment provides short, chopped material which facilitates baling and provides a one pass operation thus eliminating separated shredding and raking operations.

9 Claims, 2 Drawing Sheets

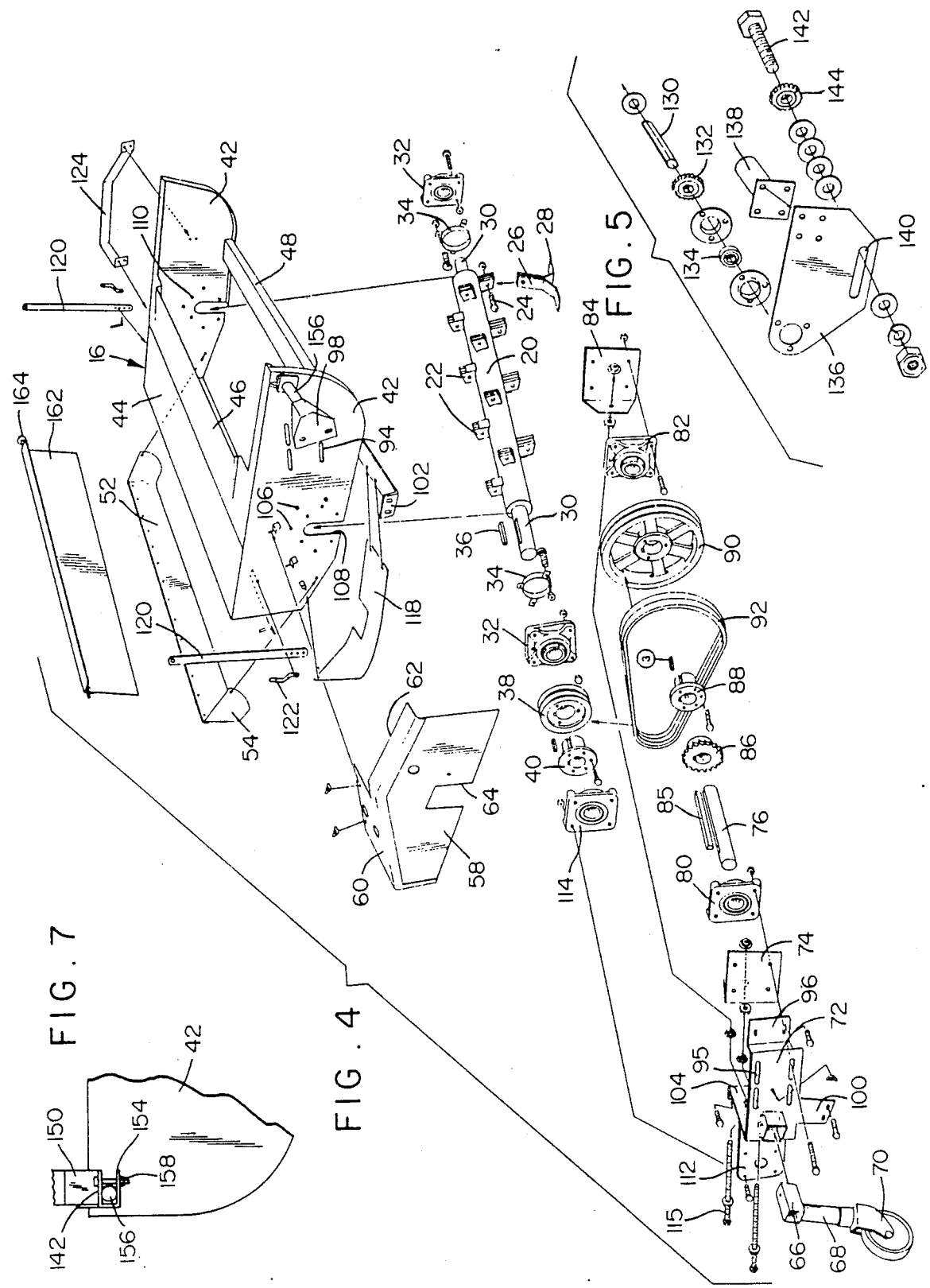

SHREDDER ATTACHMENT FOR ROUND HAY BALER

BACKGROUND OF THE INVENTION

1. Field of the Invention

The present invention generally relates to an apparatus for shredding stubble or stalks left in the field from a previous harvesting operation and more specifically relates to a shredder attachment for a round bale hay baler which will effectively shred corn stalks or stubble, milo stubble and the like and discharge the shredded stubble into a round bale hay baler which will form a bale of stubble which has been shredded which can be used for feed, bedding and the like. The shredding attachment can be easily and quickly attached to a round bale hay baler at the front lower area thereof and is drivingly connected to the power system of the hay baler and includes a rotatable shaft having a plurality of pivotal flail elements or knives mounted thereon for shredding stubble or stalks and discharging the shredded material rearwardly and upwardly into the hay baler in the same manner that hay enters the hay baler with the shredded stubble being rolled into a hay bale in the same manner that hay is baled by the round bale hay baler. The shredder attachment provides short, chopped material which facilitates baling and provides a one pass operation thus eliminating separate shredding and raking operations.

2. Description of the Prior Art

Various shredding devices have been provided in which stubble or stalks from a harvested crop can be shredded. Usually, the shredder is a self-contained device which deposits the shredded material onto the ground surface which requires a second raking or pick-up operation. The prior art also includes chopping or shredding units attached to balers of the type which produce generally rectangular bales. The following U.S. Pat. Nos. relate to this subject matter.

2,817,945
3,362,144
3,483,688
3,641,754
3,894,484

None of the above listed patents disclose the specific arrangement of the shredding unit associated with a round bale hay baler and they do not disclose the specific structural details of the attachment or the attaching structure.

SUMMARY OF THE INVENTION

An object of the present invention is to provide a shredder attachment for a round hay baler which is attached to the bottom front of a round hay baler and driven from the power system of the round hay baler and which includes a driven transverse shaft having a plurality of freely swinging knives pivotally mounted thereon which will effectively shred and chop stubble or stalks from a harvested crop into short lengths and discharge the shredded material into the round hay baler which will form a round bale from the shredded material for use as feed, bedding and the like.

Another object of the invention is to provide a shredder attachment for a round hay baler in accordance with the preceding object in which the shredder attachment is easily connected to the round hay baler in a minimum amount of time with an initial installation requiring very little adaptation of the hay baler structure with the shredder attachment including a drive structure easily connected with the drive structure of the hay baler with the components of the shredder attachment effectively shredding stubble or stalks for long periods of time without repair or replacement of components.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 4 is an exploded group perspective view of the major components of the shredder attachment.

FIG. 5 is an exploded group perspective view of one of the bearing mounting plates.

FIG. 7 is a fragmental view illustrating the support structure at the rear of the shredder attachment.

DESCRIPTION OF THE PREFERRED EMBODIMENT

Figure 1:
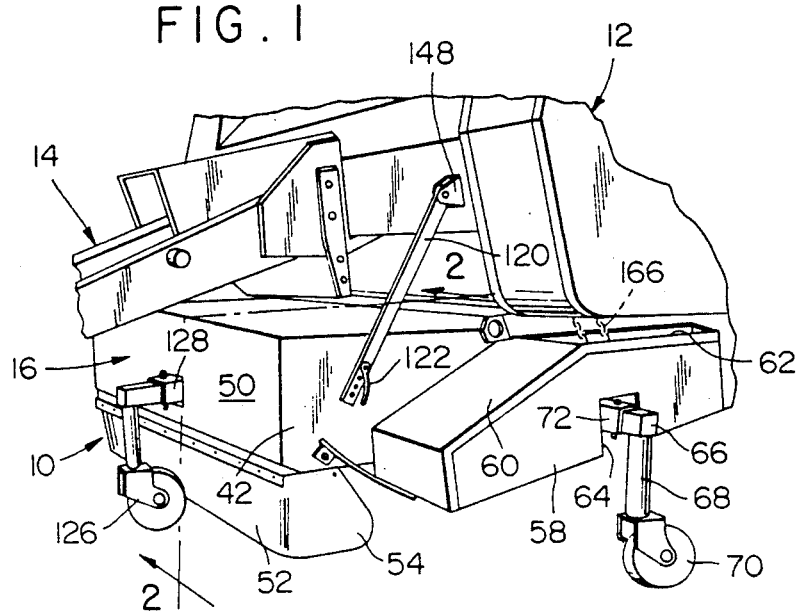
FIG. 1 is a fragmental, perspective view of a round hay baler with the shredder attachment of the present invention mounted thereon.
Figure 2:
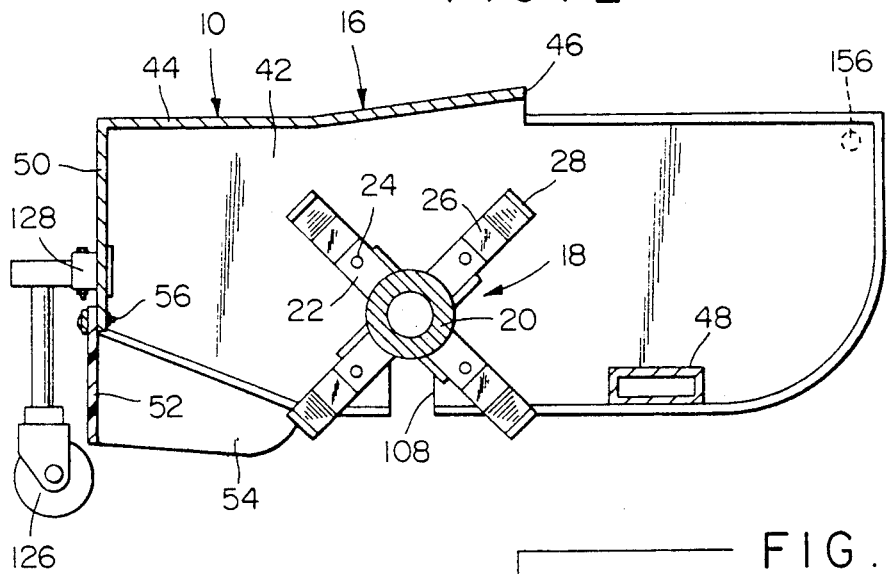
FIG. 2 is a sectional view taken generally upon a plane passing along section line 2—2 on FIG. 1 illustrating the structure of the shredder including the shaft, knives and housing.
Figure 3:
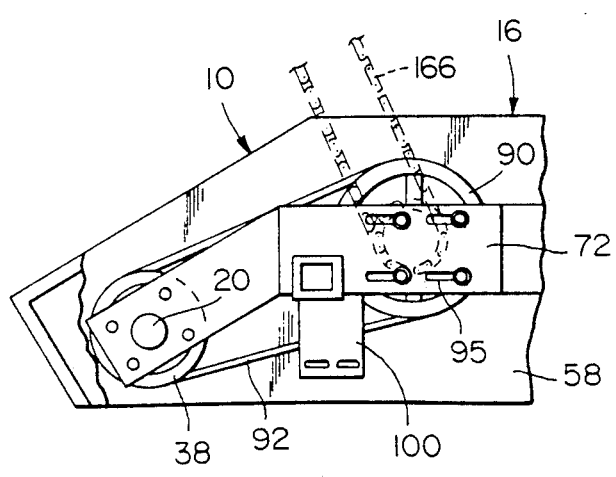
FIG. 3 is a fragmental, detailed, side elevational view illustrating the drive connection between the hay baler and shredder attachment.

Referring to the drawings, the shredder attachment is generally designated by reference numeral 10 and the round hay baler is generally designated by reference numeral 12 with the shredder attachment being attached at the front lower area of the hay baler 12 below the tongue and power take-off assembly 14 which is an existing part of the hay baler for connection to a towing tractor and its power take-off shaft. The round hay baler 12 is of conventional construction and may be a John Deere Model 535, 435, 375 or 335. However, the attachment may be adapted to various types of round hay balers and involves a four-point mounting system to insure secure attachment and vibration free operation. After initial installation, the shredder unit can be mounted or removed in approximately 15 minutes.

The shredder 10 includes a housing structure 16 and a rotor 18 positioned within the housing structure and extending generally transversely of the path of movement of the round hay baler.

The rotor 18 includes an elongated, rigid, cylindrical shaft 20 provided with a plurality of longitudinally and circumferentially spaced brackets 22 thereon each of which is in the form of spaced lugs having an aperture therethrough for receiving pivot bolts 24 which mount a plurality of knives 26 on the shaft 20 for free pivotal swinging movement. Each of the knives is generally a Y-shaped member with lateral and outwardly extending cutting elements 28 to effectively cut stubble over the complete width of the path or area traversed by the shredder attachment. The shaft 20 includes reduced cylindrical ends 30 journalled in bearings 32 which are provided with anti-wrap shields 34 on the interior thereof with one reduced end 30 of the shaft including a groove and key 36 for driving connection with a double grooved pulley 38 which has a hub 40 secured thereto and keyed to the reduced end 30 of the shaft 20 by the drive key 36.

The housing 16 includes spaced parallel side plates or shields 42 interconnected by a top panel 44 extending from the front of the shields 42 to a point generally centrally thereof with the rear edge portion of the top shield 44 being inclined upwardly as at 46. The rear bottom portions of the shields 42 are interconnected by a brace member 48 to maintain the side plates or shields 42 in parallel relation. The front of the shields or side plates 42 are interconnected by a front plate 50. A flexible, resilient skirt 52 having laterally extending end members 54 is connected to the front plate 50 and the side plates 42 by fasteners 56 to enable stubble to pass into the interior of the housing for engagement by the knives 26 on the shaft 20 with the skirt 52 serving to prevent material from exiting from the front of the shredder during rotation of the knives.

The drive side of the shredder is provided with an outer plate or shield 58 having a partial top and front wall 60 with a portion of the front wall being notched as at 62 for passage of a drive chain. The outer shield includes a downwardly opening notch 64 receiving a mounting bracket 66 for a depending support member 68 for a caster wheel 70. The support member 66 is received in and supported by a bracket structure 72 positioned interiorly of the shield 58 in a manner to support the wheel 70 and to support a bracket plate 74 for a jack shaft 76 received in bearings 80 and 82 with a support plate 84 also being provided for the bearing 82 to adjustably support the jack shaft. The jack shaft 76 includes an elongated drive key 85 which drivingly receives a sprocket 86 thereon and also drivingly receives a hub 88 of a large double grooved drive pulley 90 which is encircled by drive belts 92 which also encircle the pulley 38 for driving the pulley 38 and shaft 20 from the sprocket gear 86 with the bearings 80 and 82 and the mounting brackets or plates 74 and 84 providing adjustment of the tension on the belts 92 with the mounting plates 74 and 84 being connected to the housing. The bracket plate 84 is connected to the slotted area 94 on the side plate 42 and the mounting plate 74 is connected to slotted area 95 on bracket 72. The bracket 72 also includes an offset portion 96 connected to bracket structure 98 on the side plate 42 with the bracket 72 also including a depending bracket portion 100 secured to bracket 102 attached to the side plate 42. The bracket 72 also includes a bracket portion 104 attached to the apertured area 106 on the side plate 42 and downwardly opening notches 108 are provided on the side plates to receive the ends of the shaft 20 supported by the bearings with the bearing 32 at the end of the shaft 20 opposite the drive pulley 38 being bolted to the apertured area 110 on the side plate 42 opposite that having the drive assembly associated therewith. The bracket 72 also includes an extension 112 which supports bearing 114 which receives the reduced end of the shaft 20 to provide a stable support for the reduced end 30 of the shaft which has the double pulley 38 mounted thereon. Adjustment screws 115 are provided for adjusting the jack shaft by utilizing the slotted areas 94 and slotted areas 95 with bolts receiving the bearing structures to enable the drive belts 92 to be retained in a taut condition. The outer shield 58 includes a lower or bottom shield 118 which forms a closure for the lower end of the outer shield to protect the drive components of the shaft 20. Also, the side plates 42 of the housing have support bars 120 connected thereto by tail nuts 122 and the plate 42 opposite from that having the drive mechanism associated therewith is provided with an outwardly bowed guard 124 to protect the bearing structure 32 on the outside of plate 42.

The front plate 50 of housing 16 also includes a front caster wheel 126 detachably supported by a bracket structure 128 attached to the front member 50 in any suitable manner.

FIG. 5 illustrates the main drive shaft from the round hay baler designated by numberal 130 having the main drive sprocket 132 mounted thereon and supported by bearing 134 and bracket 136 with the bracket being supported by a bracket 138 welded to the baler. The bracket 136 includes a slotted structure 140 adjustably supporting a bolt 142 supporting a drive chain tightener sprocket 144 which retains tension on the drive sprocket chain 146 which extends to the drive sprocket 86 on the jack shaft 76.

Figure 6:
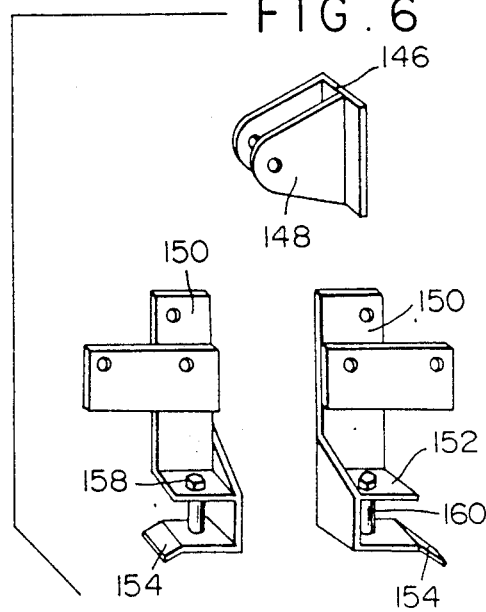
FIG. 6 is an exploded perspective view illustrating the mounting brackets for connecting the shredder attachment to the round hay baler.

FIG. 6 illustrates mounting brackets 146 including a pair of lugs 148 which pivotally connect to the upper ends of the support arms 120 as illustrated in FIG. 1 with the brackets 146 being welded or otherwise rigidly affixed to the round hay baler structure. FIG. 6 also illustrates left and right quick attach mounting brackets 150. These brackets are attached between the frame panels of the baler to support the rear of the shredder attachment with the lower end of each bracket 150 including a forwardly facing generally U-shaped bracket structure 152 having a downwardly flared lower flange 154 which enables the shredder attachment to be pushed rearwardly until the rear shredder hanger studs 156 come into contact with and are received in the forwardly opening bracket structure 152 as shown in FIG. 7. Once the shredder has been pushed all the way rearwardly, bolts 158 having a bushing 160 thereon are inserted through holes in the U-shaped brackets 152 in front of the studs 156. The forward end of the shredder is attached by the support arms 120 which requires that the forward end of the shredder be lifted which will elevate the supporting wheels from the ground surface which enables the supporting wheels to be removed or moved to a stored position since they will not be in contact with the ground surface when the shredder is being used and the shredded material is being baled.

When attaching the shredder attachment of this invention to a round hay baler, the baler and attachment should be located on a generally flat or level floor or other similar supporting surface and the baler tires should be blocked for safety and a supporting jack or adjustable prop provided for the tongue to support the tongue in elevated position at least about 19″ above the supporting surface. The hay baler is modified to the extent of removing the center compression tines and both left and right side shields since they will not be used with the shredder attachment. However, the hay baler pick-up gauge wheels will remain on the baler. Inasmuch as the shredder attachment produces substantial air movement, a curtain 162 is installed on the baler behind the baler main frame tube and in front of the lower staggered belts with one end of the curtain 162 having a square stud 164 that is placed into a square slot on the baler and the other end of the curtain is then placed behind the baler frame tube and secured by a bolt and washer assembly. The curtain should hang straight down and above the twine arm on the baler.

The shredder attachment includes a four-point mounting system including the rear brackets 150 which will be marked left and right and two front hanger brackets 146 as illustrated in FIG. 6. The rear mounting brackets 150 are mounted from the baler frame panels with the left side mounting bracket being mounted below the main belt drive roll sprocket on the baler with the mounting bracket being inserted up between baler frame panels and secured by bolts so the flanges 152 on the lower end of the bracket face forwardly. The right rear mounting bracket is mounted in a similar manner behind the oil filter and below the twine arm belt idler pulley with the bracket being inserted up and in between the baler frame panels with suitable bolts being used for this purpose with existing bolts being used where possible and, where necessary, holes are drilled for receiving adequate mounting bolts. Thus, both of the mounting brackets are located with the flanges opening forwardly and inwardly with the bolt and bushing extending between the flanges being removed to receive the studs 156 on the shredder attachment. Once the rear brackets have been installed, the shredder 10 is rolled under the baler tongue and rolled backwards to engage the studs 156 with the lower flange 152 with the inclined end 154 guiding the studs into position. When moving the studs into the brackets 150, it may be necessary to vary the elevational position of the baler tongue. Once the shredder studs 156 slide all the way back in the brackets 150, the hanger studs are locked in position by installing the spacer bushings 160 and bolts 158. The shredder is then slid to the left as far as possible until the left side rear shredder frame on side plate 42 contacts the left rear mounting bracket 150. A slide lock collar on the left rear stud 156 is then loosened and slid over to the right until it contacts the left rear mounting bracket 150 with the lock collar and hanger bolts then being tightened into position.

The two front mounting brackets 146 are then secured to the baler by welding to a baler tube or frame component with the hanger arms 120 being secured thereto by an appropriate bolt. The two brackets 150, the two brackets 146 and the two support arms 120 provide a four-point mounting system for the shredder attachment.

After the brackets have been secured to the baler and the shredder has been attached, the tongue of the baler should be raised until the wheel assemblies 70 and 126 are elevated above the floor. The wheel assemblies should then be removed or installed in a transport position since they will not come into contact with the ground surface when shredding and baling.

The shredder attachment receives its power from the main hex drive shaft on the left side of the baler to which access is gained by opening the left side door on the baler. The existing hex drive shaft is removed from inside the baler frame tube along with the associated bearing structures and the hex drive shaft 130 of this invention is inserted in lieu thereof along with bearing structures and the drive sprockets after which the drive chains 166 are placed back on the sprockets and tightened. This, in effect, provides an additional sprocket connected to the replaced hex drive shaft 130. It may be desirable to weld the two drive sprockets together to acquire more drive surface on the hex shaft. The bearing mounting plate 136 and stabilizer bracket 138 are mounted after which the shredder drive chain 166 is engaged with the idler 144 which engages the inside of the chain to rotate clockwise and, where necessary, a notch can be cut in the front door frame or panel of the baler to provide passageway for the shredder drive chain 166 with tension on the drive chain being supported and all components securely welded or otherwise attached to the baler. The shredder attachment is then ready for operation with the knives 26 being rotated with the shaft 20 to efficiently shred and chop crop stubble or stalks and discharge the shredded material upwardly and rearwardly into the baler with the baler forming a round bale for use as feed, bedding and the like.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A shredder attachment for a round hay baler comprising a housing, means supporting the housing from the hay baler at the forward lower surface thereof, said housing having an open bottom area, a generally horizontally disposed shaft rotatably mounted in said housing and adapted to be driven from the hay baler, a plurality of cutting elements mounted on said shaft with the outer ends of the cutting elements extending through the open bottom of the housing to engage, chop and shred crop stubble and stalks and discharge shredded material into the hay baler to enable the round hay baler to form a round bale of shredded stubble and stalks for use as feed, bedding and the like, said means supporting the housing from the round hay baler including a pair of supporting arms interconnecting the forward side edge portion of the housing with the hay baler and a pair of laterally extending supporting studs on the rear portion of the housing and forwardly opening sockets mounted on the hay baler for receiving said studs and removable means retaining the studs in the sockets.

2. The structure as defined in claim 1 wherein each of said cutting elements includes a generally Y-shaped knife having a shank pivotally connected to the shaft by a pivot bolt with the outwardly flared ends of the shank extending laterally to shred stubble and stalks, said cutting elements being spaced longitudinally and circumferentially on said shaft for shredding stubble and stalks throughout the path of movement of the shredder attachment.

3. The structure as defined in claim 1 wherein said housing includes a flexible member constructed of belting material attached to the forward bottom edge of the housing and extending rearwardly along the side edges thereof to enable passage of stubble and stalks under the forward end of the housing and preventing the rotating knives from discharging material forwardly.

4. The structure as defined in claim 1 further comprising a plurality of supporting wheels for the shredder attachment when the shredder attachment is not attached to the round hay baler thereby enabling the shredder attachment to be rolled under the hay baler for attachment thereto, said supporting wheels being removable thereby enabling the supporting wheels to be removed, when the shredder attachment is operative.

5. The structure as defined in claim 1 together with drive means connected with said shaft, said drive means including a pulley and belt arrangement interconnecting said shaft and a jack shaft, said jack shaft having a chain sprocket gear mounted thereon to engage a drive sprocket chain connected to a drive sprocket on the hay baler.

6. The structure as defined in claim 5 wherein said pulley and belt arrangement and sprocket gears on the jack shaft and hay baler include adjustable components to adjust the tension on the drive chain and drive belt arrangement.

7. In combination, a round hay baler and a shredder attachment therefor, said round hay baler including a frame and a power shaft adapted to be driven from a power take-off assembly on a towing tractor, said shredder attachment comprising a housing underlying the frame, means removably supporting the housing from the frame in a generally horizontal position at the forward end of the lower surface of the hay baler, said housing including a transversely extending shaft generally horizontally disposed and rotatably supported in the housing, drive means interconnecting the hay baler power shaft and said rotatable shaft in the housing, said rotatable shaft including a plurality of radially extending cutting elements, means pivotally supporting the cutting elements on said shaft for pivotal movement about an axis parallel to the rotational axis of the shaft, said housing having an open bottom area through which the cutting elements project for engaging and shredding harvested crop stubble, said housing including an open area in the upper rear portion thereof for discharge of shredded material from the housing into the hay baler to enable the hay baler to form round bales off shredded stubble, said drive means including a belt and pulley arrangement connected to said rotatable shaft, a jack shaft rotatably supported by said housing and including a drive pulley engaged with the pulley and belt arrangement connected with the rotatable shaft, a chain drive sprocket gear mounted on said jack shaft, a chain drive sprocket gear mounted on the power shaft of the baler and a drive chain encircling the chain sprocket gears to drive the shaft and cutting elements from the hay baler.

8. The combination as defined in claim 7 wherein said means removably supporting the housing from the frame includes a pair of brackets on the frame, a pair of studs on the housing adjacent the rear thereof connected with said brackets and a pair of support arms mounted on the frame forwardly of the brackets with the support arms extending downwardly from the frame and means detachably connecting the arms to the forward portion of the housing to provide four points of attachment of the housing to the frame.

9. The combination as defined in claim 8 wherein said brackets are in the form of forwardly opening sockets receiving said studs when the housing is moved rearwardly in relation to the frame, said studs extending laterally from the housing for reception in the sockets and a retaining member removably inserted through each of said sockets forwardly of the studs received in the sockets to releasably retain the studs in the sockets to enable easy attachment and removal of the housing in relation to the frame.

* * * * *